Oct. 22, 1957 H. N. GIBSON 2,810,819
LIGHT PROJECTING APPARATUS
Filed April 1, 1953 7 Sheets-Sheet 4
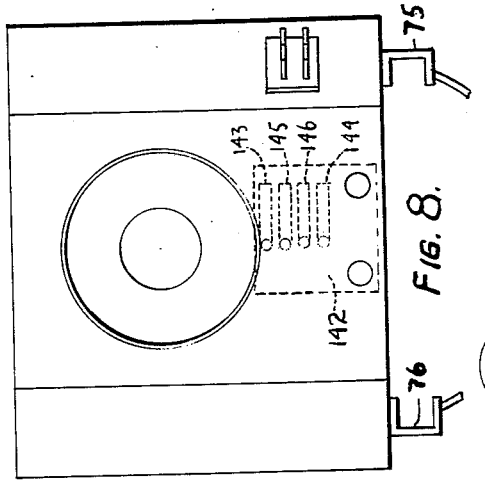
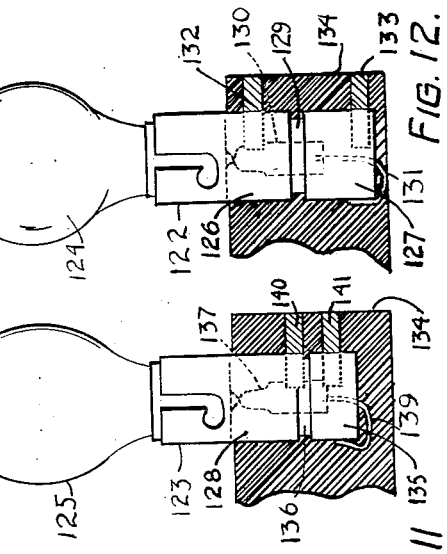
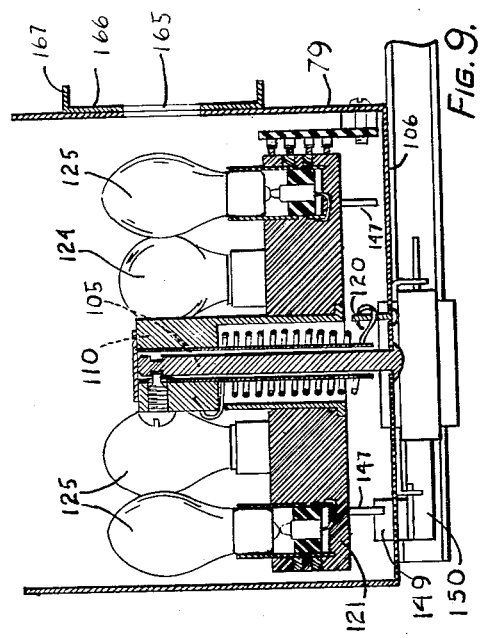
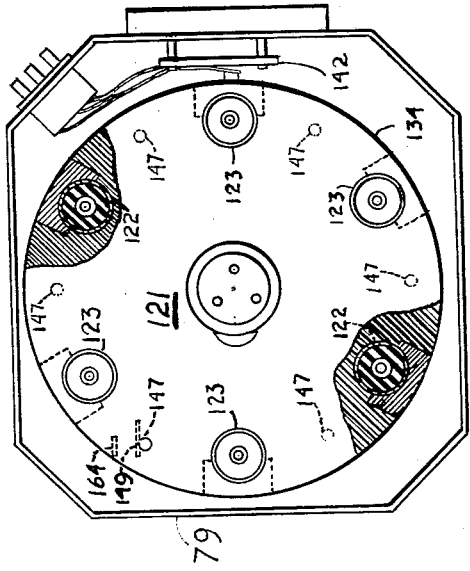
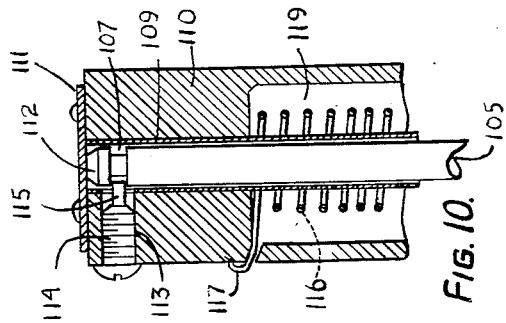
INVENTOR
*Horace N. Gibson*
BY *Robert M. Denning*
ATTORNEY

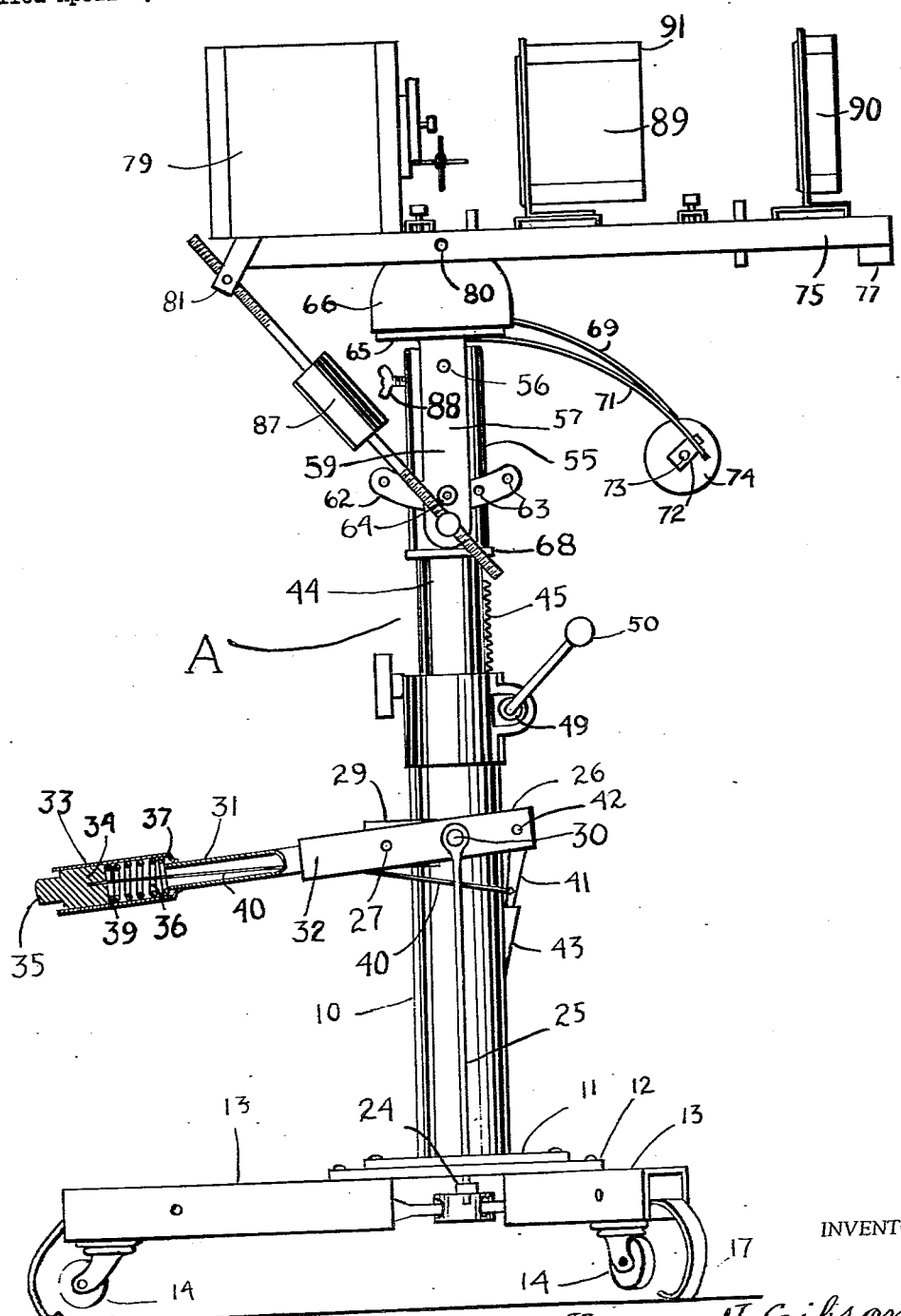

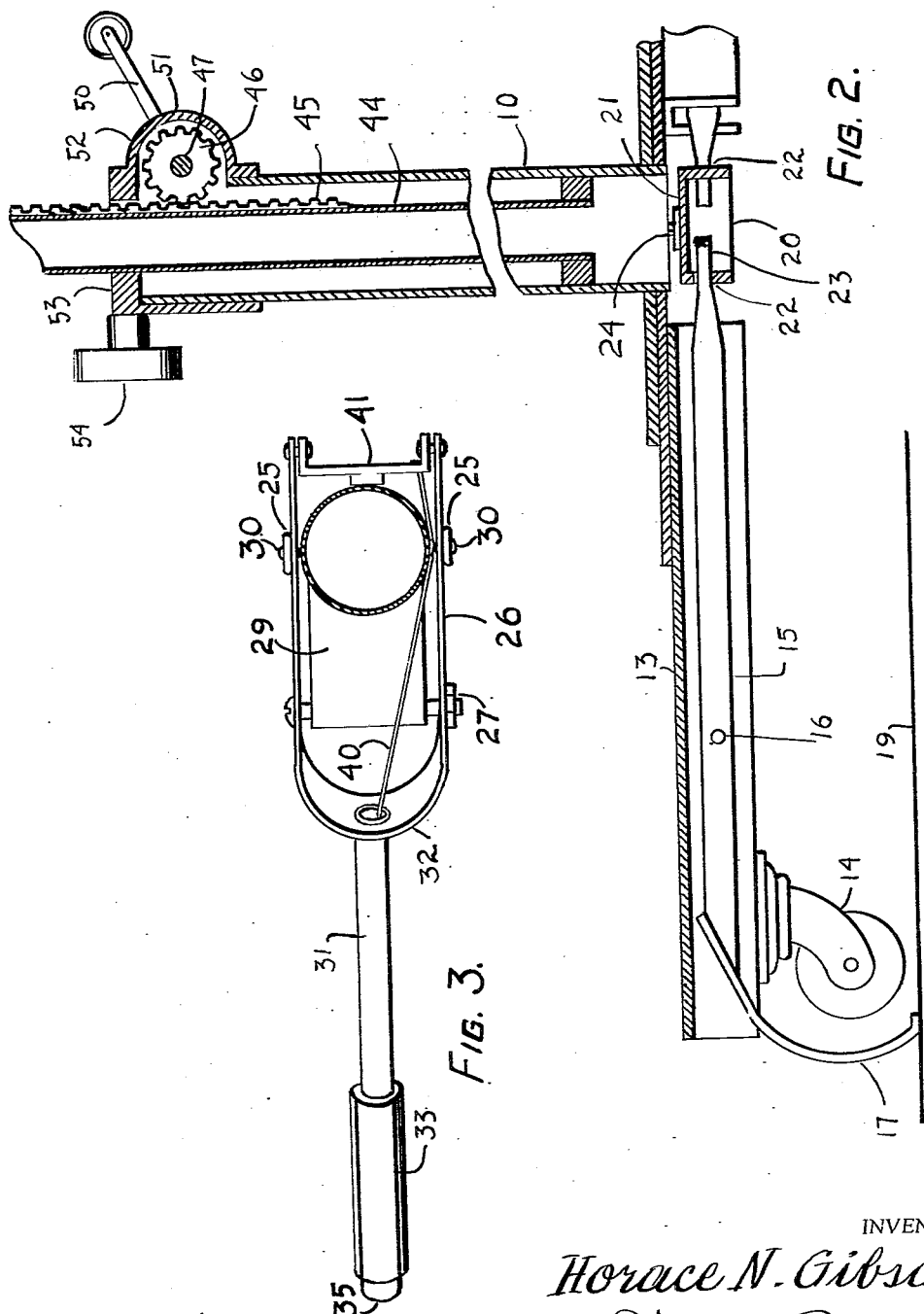

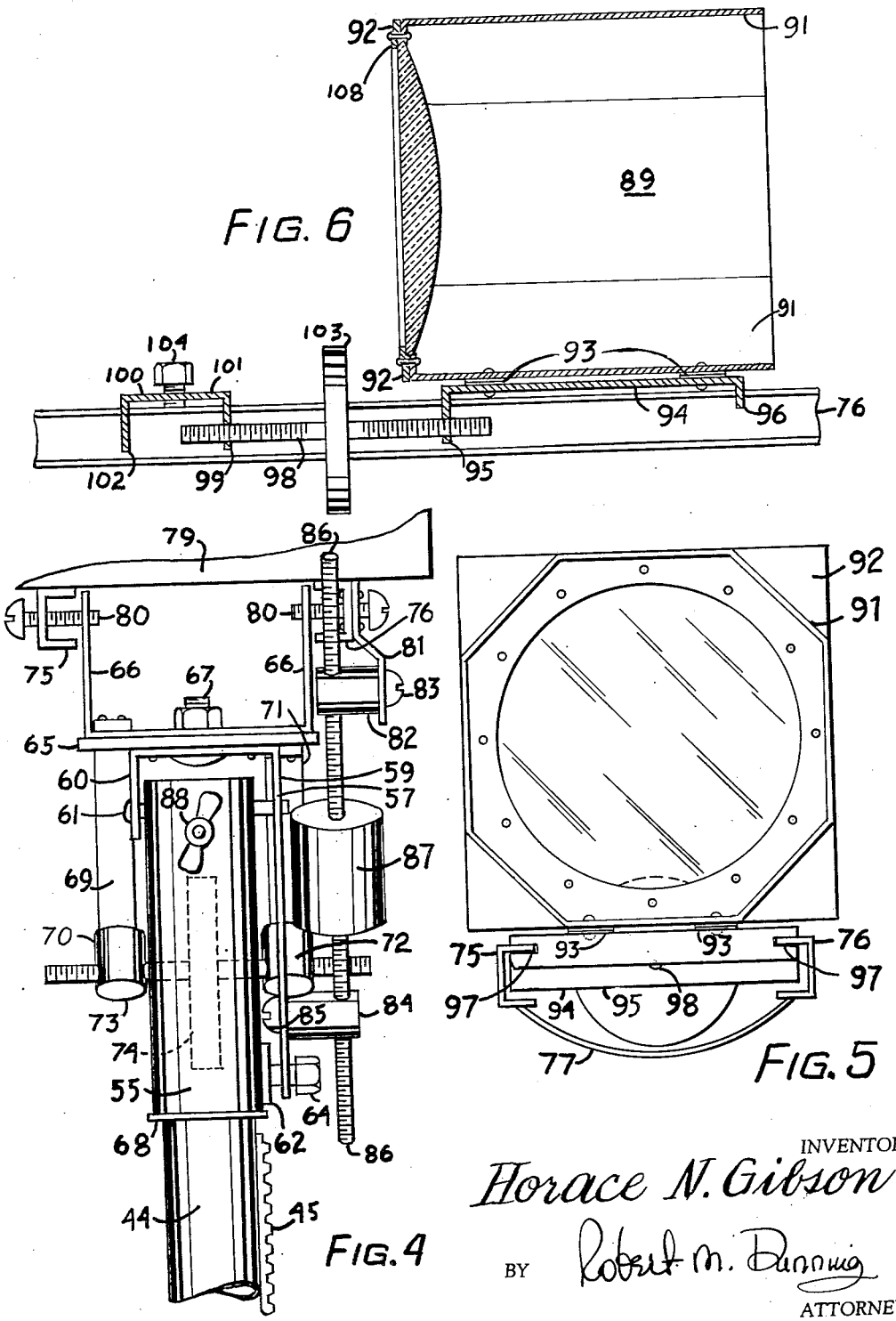

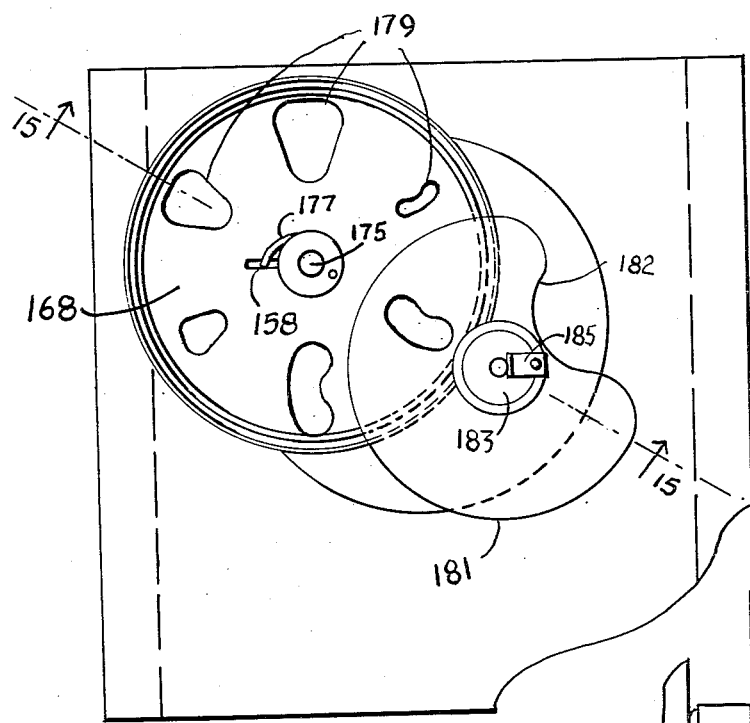
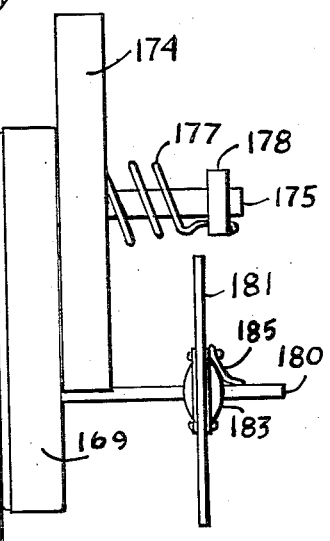
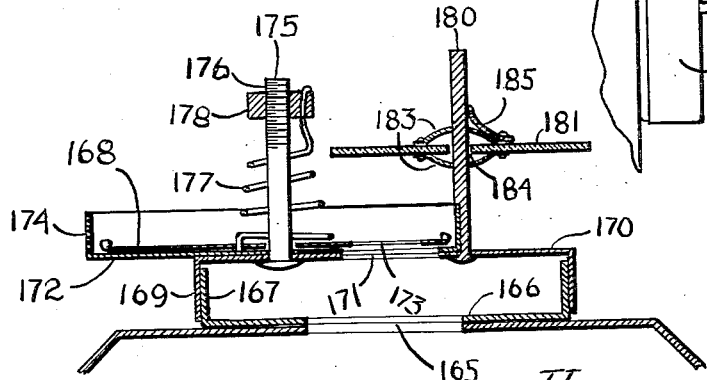

Oct. 22, 1957    H. N. GIBSON    2,810,819
LIGHT PROJECTING APPARATUS
Filed April 1, 1953    7 Sheets-Sheet 6
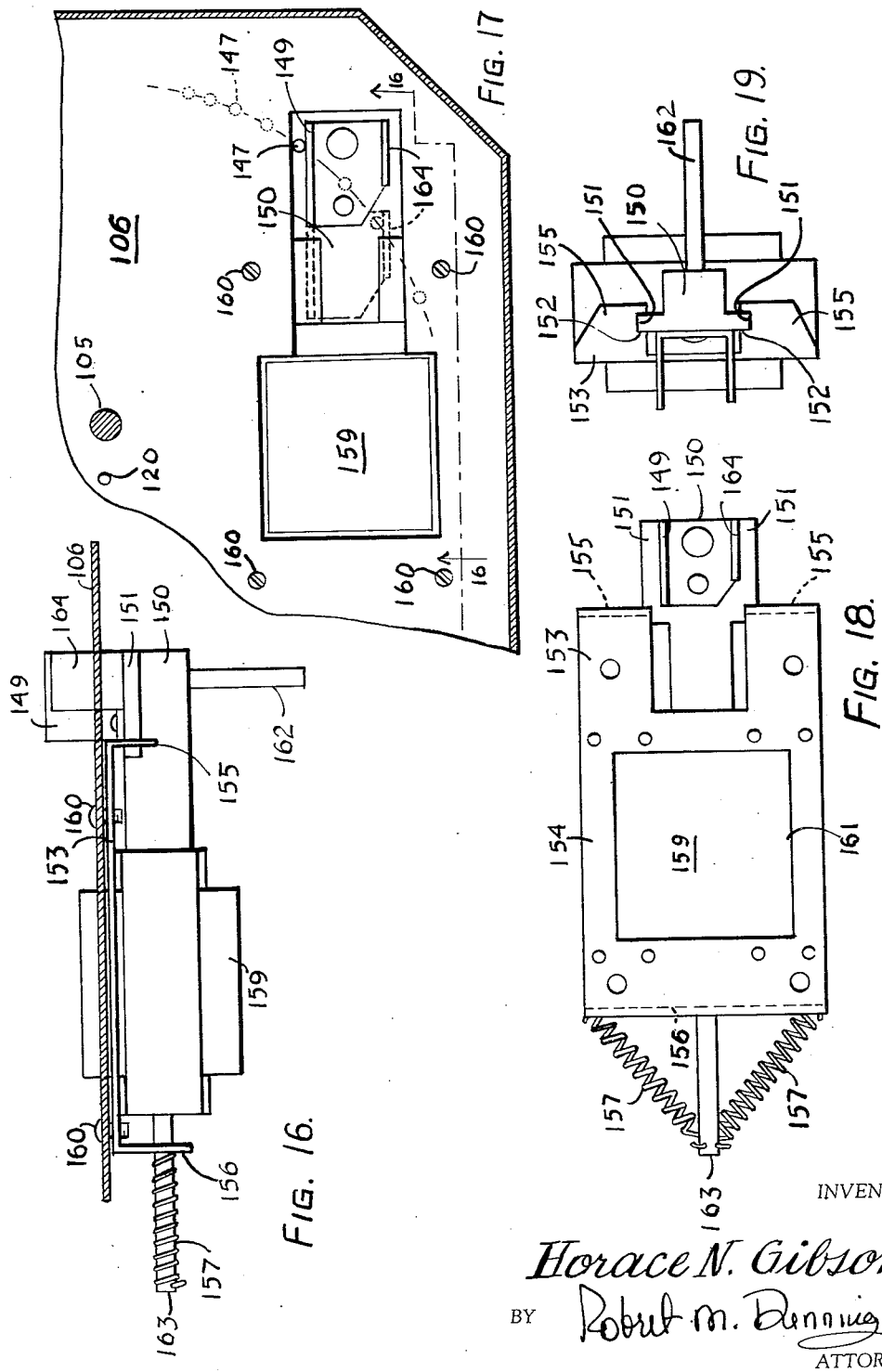
INVENTOR
Horace N. Gibson
BY Robert M. Denning
ATTORNEY Oct. 22, 1957 H. N. GIBSON 2,810,819
LIGHT PROJECTING APPARATUS
Filed April 1, 1953 7 Sheets-Sheet 7
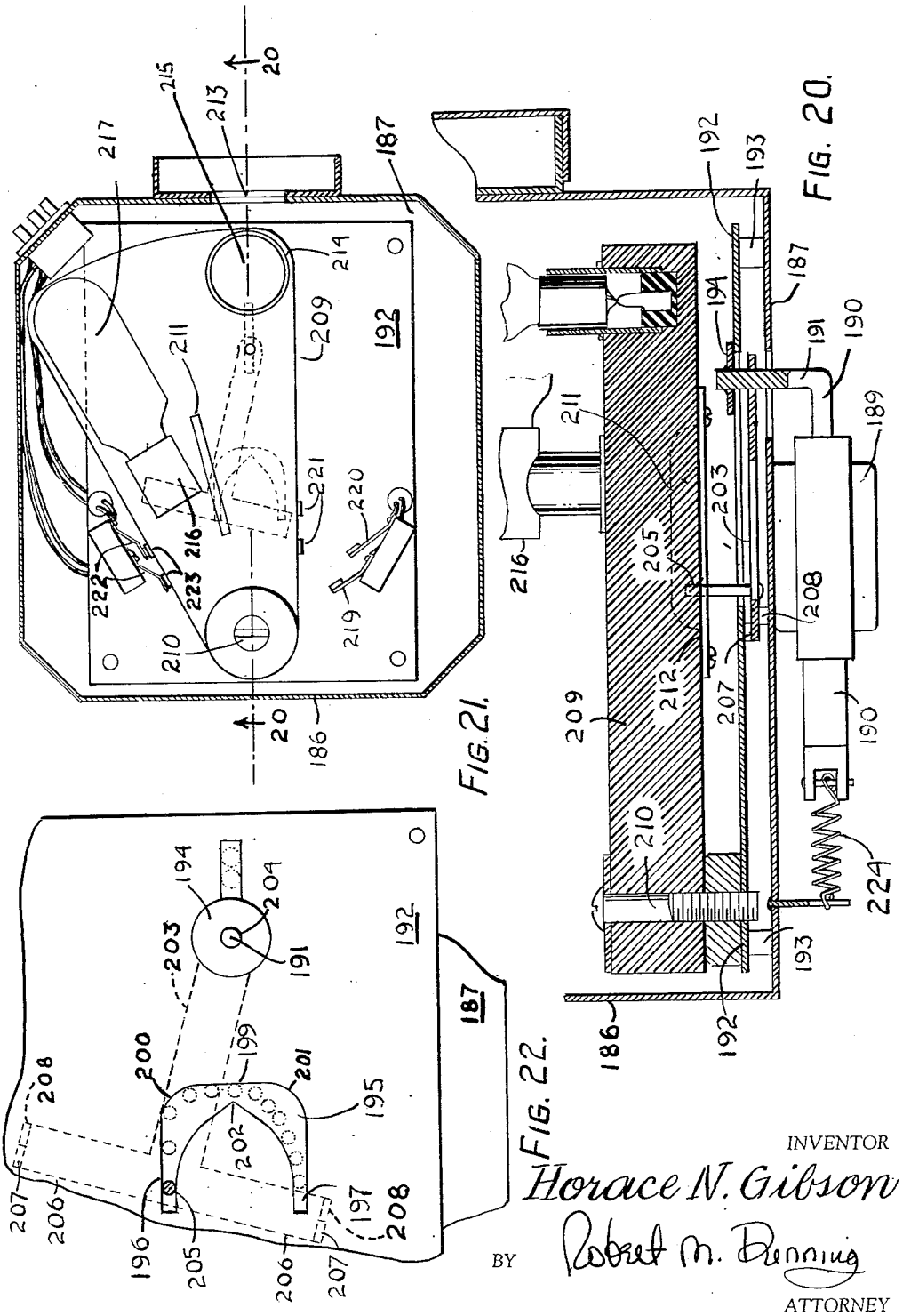
INVENTOR
Horace N. Gibson
BY Robert M. Denning
ATTORNEY United States Patent Office 2,810,819
Patented Oct. 22, 1957

2,810,819

LIGHT PROJECTING APPARATUS

Horace N. Gibson, St. Paul, Minn.

Application April 1, 1953, Serial No. 346,217

6 Claims. (Cl. 240—1.3)

This invention relates to an improvement in light projecting apparatus and deals particularly with apparatus used in the illumination of subjects being photographed.

Difficulty is ordinarily experienced in the use of light projecting apparatus used in taking pictures. Such an apparatus is ordinarily difficult to adjust and difficult to hold in adjustment. The apparatus has been hard to focus and aim when the light to be used is either a flash bulb or an electronic flash light, due to the brief duration of such a light. Trouble has always been experienced in producing either a clearly defined light spot or a spot having blended or graduated edges.

Attempts have been made to employ a continuously burning light during the aiming and focusing process, and to then employ a flash bulb or electronic flash light when the picture is taken. However, the interval of time usually required to make the substitution often is sufficient to permit the subject to move and to thereby destroy the desired effect. When the continuously burning light and the flash bulb, or electronic flash light are placed in close proximity the difference in position is often sufficient to entirely change the light pattern on the subject.

An object of the present invention resides in the provision of a lighting device which incorporates a bulb which provides a strong light which may be used for focusing and which incorporates a flash bulb or electronic flash light which can be used to provide the actual illumination when the picture is taken. The bulbs are mounted in such a manner that one bulb will take the place of the other after the focusing operation. As the picture is taken the flash bulb takes the place of the focusing bulb and is positioned to direct light in the same manner as the bulb used in focusing.

A feature of the present invention resides in the provision of a light projecting apparatus which includes a series of bulbs supported upon a rotatable support in such a way that the bulbs or electronic flash light may sequentially move into projecting position.

When the focusing operation is complete the light used swings out of projecting position and the flash bulb or electronic flash light immediately swings into position to project its light.

A further feature of the present invention resides in the provision of a light projecting system which directs light through any of a series of light apertures. In order to project a beam of light of the proper outline to produce the effect desired, I provide an aperture plate containing a series of apertures. The plate is opaque and light may shine through the apertures or transparent portions thereof. By moving one aperture or another in the path of the light rays, the pattern of the light rays may be changed.

A further feature of the invention lies in the provision of a light projecting apparatus capable of projecting light beams which produce a pattern of predetermined shape having either sharply defined edges or indistinct graduated edges. Thus a light pattern of predetermined character may be projected onto the subject so as to enhance the lighting thereof from an artistic standpoint. Means are provided in the aperture so that a light beam of any shape being projected through the various mechanisms may be rotated in a clockwise or counter clockwise direction.

These and other objects and novel features of my invention will be more clearly and fully set forth in the following specifications and claims.

In the drawings forming part of my specification:

Figure 1 is an elevation view of my light projecting apparatus.

Figure 2 is a sectional view through the lower portion of the supporting standard of my light projecting apparatus.

Figure 3 is a transverse sectional view through a portion of the standard.

Figure 4 is an elevation view of a detail portion of the standard.

Figure 5 is a front elevation view of the upper portion of the apparatus.

Figure 6 is a sectional view through one of the lenses.

Figure 7 is a top plan view of the light housing.

Figure 8 is a front elevation view of the light housing, the supporting frame being shown in section.

Figure 9 is a sectional view through the light housing.

Figure 10 is a sectional view through a portion of the light mounting rotor support.

Figure 11 is a sectional view through a portion of the light support.

Figure 12 is a view similar to Figure 11.

Figure 13 is a front elevational view of the housing with the aperture disc and light diffusing plate supported thereupon.

Figure 14 is a side elevational view of the forward part of the light housing.

Figure 15 is a sectional view through the aperture plate and diffusing plate, the position of the section being indicated by the line 15—15 of Figure 13.

Figure 16 is a sectional view through a bottom portion of the light housing showing a solenoid escapement mechanism attached thereto.

Figure 17 is a diagrammatic top view of a portion of the housing floor showing the operation of the escapement mechanism.

Figure 18 is a top view of the escapement mechanism removed from the housing.

Figure 19 is an end view of the escapement mechanism removed from the housing.

Figure 20 is a sectional view through a housing of a modified form.

Figure 21 is a top plan view of the housing shown in Figure 20.

Figure 22 is a diagrammatic view showing the operation of certain of the structure shown in Figures 20 and 21.

The light projecting apparatus is indicated in general by the letter A and is shown in assembled form in Figure 1 of the drawings. The projector is supported by a standard including an upright tubular member 10 which is anchored by a bottom flange 11 to a gusset plate 12. This plate 12 acts to connect three radially extending inverted channels 13 which are spaced 120 degrees apart in the particular form of construction illustrated. Casters 14 are supported at the outer extremity of each of the arms 13 so that the apparatus may be moved about.

As indicated in Figure 2 of the drawings, a lever 15 is pivotally connected at 16 between the vertical sides of each channel 13. A curved arm 17 is mounted at the outer end of each lever 15. This curved arm 17 is designed to swing down into contact with the floor or other supporting surface 19. When the arms 17 are in engagement with the floor, the casters 14 are slightly elevated from the floor so that the apparatus A will remain in fixed position.

In order to operate the levers 15, I provide a sleeve 20 having a closed upper end 21 and having three angularly spaced slots 22 therein to accommodate the reduced cross sectional area end 23 of each lever arm 15. The slots 22 are of proper size to permit the necessary relative pivoting of the levers 15 and vertical movement of the sleeve 20 pivots the arms 15 in unison.

As indicated in Figure 1 of the drawings, lugs 24 extend laterally from the sleeve 22 on opposite sides of the center thereof. Rods 25 connect the lugs 24 with a generally U-shaped yoke 26. The yoke 26 is pivotally connected at 27 to a lug 29 supported by the tubular standard 10. The rods 25 are pivotally connected at 30 to the sides of the yoke 26. A handle 31 is connected to the closed end 32 of the U-shaped yoke 26. The handle 31 is preferably tubular and is provided with an enlarged diameter end 33. A plunger 34 having a reduced head 35 is slidable in the tubular handle 31. A spring 36 is interposed between the shoulder 37 formed between the two diameter portions of the handle and a shoulder 39 on the plunger 34. The spring 36 urges the plunger outwardly of the handle. A rod 40 connects the plunger 34 to a dog 41 pivotally connected at 42 between the parallel ends of the yoke 26. A wedge shaped stop lug 43 is provided on the standard 10 engageable with the dog 41 in one position of the yoke 26. This dog 41 holds the yoke in position to exert an upward force upon the rods 25 and accordingly holds the curved arms 17 in engagement with the floor surface. By pressing inwardly on the head end 35 of the plunger 34 the dog 41 may be swung out of engagement with the stop lug 43 so that the handle and yoke may be swung in a clockwise direction as viewed in Figure 1. When thus pivoted the sleeve 22 is lowered and the levers 15 are pivoted in a manner to raise the curved arms 17 out of contact with the floor.

The tubular standard 10 is in telescoping relation with an inner tubular standard member 44. As best illustrated in Figure 2 of the drawings the inner tubular standard 44 is provided with a rack 45 extending along the surface thereof. A pinion 46 is pivotally supported upon a transverse shaft 47 supported by bearings 49 (Fig. 1) and is provided with a crank 50 by means of which the shaft 47 and the pinion 46 may be rotated. A casting 51 encircles the upper end of the standard 10 and includes a housing portion 52 enclosing the pinion 46. The upper end of the casting 51 extends above the top of the standard member 10 and is provided with a collar portion 53 which encircles the inner standard 44 and acts as a bearing therefor. This collar portion 53 is vertically split and the collar may be tightened by means of a hand wheel 54 which extends freely through one side of the collar and is threaded into the other. The hand wheel 54 may thus be used to hold the inner standard 44 at any adjusted elevation.

To the upper end of standard 44 is welded a supporting ring 68 which acts as a support for rotatable member 55. Member 55 is tightened securely at any desired position by hand operated set screw 88. Pivotally connected to the member 55 at 56 is a yoke 57 (see Figure 4) provided with a long arm 59 and a shorter arm 60. A pivot 61 extends through the yoke sides 59 and 60 to pivotally connect the yoke to rotatable member 55.

An arcuate bracket 62 is attached to the lower end of rotatable member 55 and is provided with a series of apertures 63 therein in angularly spaced relation. All of the apertures 63 are equidistant from the pivot 56. A pin 64 is extended through the side of 59 and 60 of yoke 57 and any of the apertures 63 to hold the yoke at a desired angular relation of the standard.

The yoke 57 supports a plate 65 at its upper extremity. The plate 65 serves as a bearing plate and is on a horizontal plane when the yoke 57 is in center position. A generally U-shaped bracket 66 is pivotally connected by a pivot bolt 67 to the plate 65 to rotate about the axis of the pivot bolt 67. A forwardly and downwardly curved strip 69 is connected to the bracket 66 and is provided at its lower extremity with a bearing 70. A similar forwardly and downwardly curved strip 71 is connected to the undersurface of the bearing plate 65 and is provided with a bearing 72 at its forward extremity. The bearings 70 and 72 are similarly constructed and have aligned threaded apertures therein designed to accommodate a transversely extending threaded rod 73. This rod is provided with a central adjustment wheel 74 and is provided with a right hand thread at one end and a left hand thread at the other. The bearings 70 and 72 are correspondingly threaded to accommodate the ends of the rod 73. By rotating the hand wheel 74 in one direction the strips 69 and 71 may be moved apart while rotation of the hand wheel in the other direction will move these parts together. This operation exerts a corresponding rotative force to rotate the bracket 66 relative to the bearing plate 65. The bearings 70 and 72 are pivotally supported so as to compensate for the varying angularity between the arms.

The bracket 66 is designed to accommodate the light projecting mechanism shown at the upper extremity of Figure 1. The light projecting apparatus is supported upon a frame which includes two spaced opposed channels 75 and 76 which are connected at their forward ends by a cross member 77 and are connected at their rear ends by a light enclosing housing 79 which will be later described in detail. The channel members 75 and 76 extend in parallel relation and are pivotally connected to the bracket 66 by transverse aligned pivots 80. A bracket arm 81 is secured to one channel member 75 to extend rearwardly and downwardly therefrom. As indicated in Figure 4 a pivot member 82 is pivotally connected at 83 to the bracket 81. A similar pivot 84 is pivotally connected at 85 to the side 59 of the yoke 57. A threaded rod 86 extends through the pivots 82 and 84 and is provided with a central enlarged portion 87 by means of which the threaded rod may be rotated. One end of the rod 86 is provided with a right hand thread and the other with a left hand thread. The pivots 82 and 84 are correspondingly threaded to receive the ends of the threaded member. By rotating the threaded member in one direction the distance between the pivots may be increased and rotation of the rod in the other direction will decrease the distance between the pivots.

Due to the fact that the bracket 66 may pivot somewhat relative to the bearing plate 65 when sideways adjustments are made by the hand wheel 74, it must be noted that the looseness and play caused by the various mechanisms would accommodate slight adjustments and that when large adjustments are needed a loosening of thumb bolt 88 and a retightening of it after the adjustments are made would relieve the major strain.

An examination of Figure 1 of the drawings will show two lenses 89 and 90 which are slidably supported upon the opposed channels 75 and 76 for movement longitudinally thereof. Both of these lenses are similarly supported and accordingly the details of construction of only one lens 89 is shown in detail. Figures 5 and 6 of the drawings show a light baffle hood 91 which encircles the lens element to prevent stray light beams from being directed toward the subject.

Vertical adjustment of the lenses in relation to the channels 75 and 76 is made by means of four sets of one or more washers 93 surrounding suitable bolts or other means of connection, which connect light baffle hood 91 to supporting plate 94. The plate 94 is provided with spaced downwardly extending flanges 95 and 96. These flanges are provided with notches 97 in opposite vertical edges thereof (see Fig. 5), so as to guide the mounting plate in its movement along the channels.

The movement of each lens is effected by a threaded rod 98 which extends through the flange 95 and through a second downturned flange 99 of a bracket 100. The bracket 100 includes a horizontal plate 101 and a downturned flange 102 on the edge thereof opposite the edge supporting the parallel flange 99. The threaded rod 98 is provided with a hand wheel 103 intermediate its ends by means of which the rod may be rotated. One end of the rod 98 is provided with right hand threads while the other is provided with left hand threads and the flanges 95 and 99 are correspondingly threaded. Rotation of the hand wheel 103 in one direction will move the mounting plate 94 forwardly relative to the bracket 100 while rotation in the opposite direction will move the mounting plate rearwardly. One or more set screws 104 extend through the plate 100 of the bracket 99 and bear against the upper surface of the channels 75 and 76 to hold the bracket 99 from movement longitudinally of the channels.

As indicated in Figure 1 both the lens units 89 and 90 are substantially the same. The initial adjustment is obtained by loosening the set screws 104 and moving the lens unit into approximately the proper position. The set screws 104 are then tightened and the finer adjustment obtained by rotation of the wheels 103.

Each lens unit such as the unit 89 includes a light baffle hood 91 and a plate 92 containing an aperture for the lens body. Outwardly directed flange 108 holds the marginal edge of the lens body between light baffle hood 91 and plate 92. The two members are held in rigid alignment by a series of rivets shown in Figure 5.

The housing 79 at the rear end of the opposed channels 75 and 76 supports the light source. The housing 79 is shown as being generally rectangular in form with the corners angled. A vertical pivot post 105 is anchored to the closed bottom 106 of the housing 79 to extend upwardly therefrom as indicated in Figure 9. This post 105 is provided with a peripheral groove 107 at its upper extremity as best shown in Figure 10. A sleeve 109 encircles the upper extremity of the pivot post 105 and is rotatable relative thereto. The sleeve 109 is connected to a hub 110 which fits snugly about the upper end of the sleeve 109. A plate 111 closes the upper end of the hub 110 and limits the insertion of the post 105 into the sleeve 109. The upper end of the post 105 is preferably beveled as indicated at 112 and the plate may bear against the upper end of the post.

A radially extending internally threaded aperture 113 extends into the hub 110 and accommodates a set screw 114 having a reduced diameter end 115. This end 115 extends through a hole in the sleeve 109 and engages in the groove 107. The set screw 114 merely holds the hub and sleeve from accidental removal from the post 105 and does not fit tightly against the post so as to interfere with the rotation of the hub.

A spring 116 is anchored at one end 117 to the hub 110 and is enclosed within the enlarged diameter recess 119 in the lower end of the hub 110. The lower end of the spring 116 is anchored in any suitable means to the closed bottom 106 of the housing 79. In the construction illustrated the lower end of the spring extends over the pin 120 on the bottom member 106. This arrangement permits the hub to be lifted from the post when desired and still permits the spring end to be anchored from rotation when the hub is in place so that torsion can be placed upon the spring by rotating the hub in the proper direction.

The hub supports a disc 121 which is preferably wholly or partially formed of insulating material. For the purpose of simplicity the disc is shown made entirely of insulating material. The disc supports a series of angularly spaced upwardly directed lamp sockets. Two opposed lamp sockets are identified by the numeral 122 while the remaining lamp sockets are identified by the numeral 123. The lamp sockets 122 are designed to accommodate light bulbs which will provide a bright continuous light, such a bulb being indicated at 124 in Figure 12. The sockets 123 are designed to support flash light bulbs 125.

The sockets 122 include an upper metallic portion 126 and a lower metallic portion 127. These portions are held in spaced relation by an insulating plug 129 frictionally engaged within the tubular socket portions. A central contact 130 extends through the plug 129, the center contact, and is connected to the lower sleeve portion by a suitable conductor 131. A contact lug 132 of electrically conductive material is secured to the socket portion 126 and a similar conductive lug 133 is connected to the lower socket portion 127. These lugs 132 and 133 extend flush with, or project slightly from, the peripherly 134 of the disc 121. The outer margin of each lug 132 and 133 is arcuate to follow the curvature of the periphery disc.

The sockets 123 are similarly constructed. They include an upper conductive portion 128 and a lower conductive portion 135 being spaced by an insulation plug 136. A central contact 137 extends through the plug 136 and is electrically connected to the lower socket portion by a conductor 139. Conductive lugs 140 and 141 are provided on the socket portions and extend outwardly to the periphery of the disc 121, the outer margins of the lugs following the curvature of the disc or projecting slightly beyond the same.

The sockets 122 and 123 thus accommodate bulbs 124 and 125 of the bayonet construction type. One terminal of each such bulb is electrically connected to a conductive sleeve on its base which is electrically connected to the upper socket portion. A central contact is provided on each bulb which engages the center contact 130 or 137 of the corresponding socket. Thus the terminals of the light bulb are electrically connected to the conductive lugs extending to the periphery of the disc 121.

It will be noted that the lugs 132 and 133 are spaced apart a distance substantially greater than the spacing of the lugs 140 and 141. Thus the lugs 132 and 133 are engageable with a different pair of contact blades than are the lugs 140 and 141. The contact blades are indicated in Figures 7, 8, and 9 of the drawings. The four contact blades are vertically spaced upon an insulation mounting plate 142. The upper blade 143 and lower blade 144 are engageable with the lugs 132 and 133 of the sockets 122 and supply current to the bulb. As the bulbs of the continuous burning type are usually designed for 110 volt current, such current may be supplied to the bulb from these contacts. The remaining inner contacts 145 and 146 are engageable with the lugs 140 and 141 of the lamp sockets 123 and may supply a lower current such as a 6 volt current to the flash bulbs 125.

In the previous description it has been explained that the disc 121 is urged in one rotative position by means of a spring 116 which can be wound up when necessary. In order to permit the controlled rotation of the disc, I provide an electrical releasing device, the position of which is indicated in Figures 7 and 9 of the drawings and which is shown in detail in Figures 16 through 19. The disc 121 is provided with a series of angularly spaced downwardly projecting pins 147 on the undersurface thereof. These pins are similar in number to the various light sockets and are so located as to successively stop each light bulb in alignment with the light aperture which will be later described. The pins 147 successively engage an elongated upwardly projecting shoulder 149 of a reciprocal plunger 150. The plunger 150 is provided with the laterally extending wings 151 which are engaged in grooves 152 of a supporting guide 153. The guide is secured to the floor 106 of the light housing 79 and depends therefrom.

The guide 153 comprises a flat mounting plate of non-magnetic material having a central body portion 154 which underlies the housing floor 106 and extends in surface contact therewith. The guide includes a pair of downwardly extending flanges 155 at one end of the plate portion 154 which are in spaced relation and in which the grooves 152 are provided. Flange means 156 is also provided at the opposite end of the body portion 154 to serve as anchors for plunger biasing springs 157.

The housing floor 106 is secured by bolts 160 or other suitable means to the plate 154. A solenoid coil 159 is supported beneath the plate 154, a portion of the coil, in some instances extending upwardly through an aperture 161 in the body portion of the plate and through a corresponding aperture in the housing floor 106. The plunger 150 extends through the coil 159. The springs 157 are connected to an extension 163 on the plunger 150 to normally bias the plunger 150 to one extreme position.

In the normal extreme position illustrated in Figure 17, the pins 147 engage against the stop flange 149 and hold the disc 121 from further rotation. When rotation of the disc is desired, the solenoid coil 159 is energized, moving the plunger to the left from the position as viewed in Figure 17 so as to withdraw the flange 149 from the path of movement of the pin 147. The plunger is provided with a second flange 164 which is normally out of the path of movement of the pin 147 but which is moved into the path of movement of the pins by the retraction of the plunger 150. This is clearly visible in Figure 17 of the drawings where the second extreme position of the flanges 149 and 164 is shown in dotted outline.

Thus in order to control the rotation of disc 121, the plunger and the flanges 149 and 164 form an escapement mechanism which first releases the pins 147 from engagement with the flange 149 and moves the flange 164 into the path of movement of the pin. Upon the de-energization of the solenoid coil 159 the plunger returns by action of the springs 157 to its starting position, moving the flange 164 out of engagement with the pin and moving flange 149 back into the path of the next succeeding pin 147. The escapement mechanism thus prevents the disc from advancing in rotation more than a predetermined angular distance for each energization of the solenoid coil 159 regardless of the duration of the energization.

Energy must be stored in spring 116 to replace that consumed when disc 121 rotates clockwise in the normal operation of bringing fresh flashbulbs into alignment with aperture 165. This is accomplished easily by winding counterclockwise disc 121 by one hand and the other hand operating escapement handle 162.

It will be noted that whenever disc 121 is rotated counterclockwise that the pins 147 avoid contact with flange 164 but strike the back of flange 149. A short inward push of escapement handle 162 permits the pins 149 to weave backward through the escapement mechanism and replace all spring energy lost in spring 116.

Figure 9 of the drawings discloses a light aperture 165 in one of the walls of the housing. This light aperture is encircled by an apertured plate 166 having a generally cylindrical rim 167. With reference now to Figures 13, 14 and 15 of the drawings, it will be noted that this rim 167 may extend in frictional engagement with a cooperable rim 169 of a plate 170 having an aperture 171 therein in alignment with the plate aperture and the housing aperture 165. Attached to the outer surface of the plate 170 is a disc 172 having an aperture 173 therein in registry with the aperture 171. The disc 172 is provided with an outwardly turned peripheral rim or flange 174.

A pivot 175 having an outer threaded end 176 is anchored to the plate 170 and disc 172 at the axis thereof. An aperture plate 168 is pivotally supported upon the pivot 175 to pivot around the axis of the pivot 175. Aperture plate 168 contains a radial slot 158 and various shaped apertures described later.

A spring 177 encircles the pivot 175 and is preferably anchored at one end to an adjustment nut 178. The other end of the spring bears against the aperture disc 168 and a small turned down hook at the end of the spring enters radial slot 158, and bears against disc 172. Rotation of adjustment nut 178 brings additional pressure against aperture plate 168 and at the same time causes aperture plate 168 to rotate clockwise or counterclockwise according to the direction of rotation of adjustment nut 178.

The aperture plate 168 is provided with a series of apertures 179 thereof each of which is a different shape or different size so as to provide a predetermined shape of light pattern. Alternatively the aperture plate 168 may be made of transparent material and coated or masked so as to provide transparent areas through which the light may pass. The aperture plate is easily removable so that it may be replaced with another plate having different apertures or transparent light pattern portions therein.

Also supported by the plate 170 and projecting outwardly therefrom in parallel relation to the pivot 175, is a second pivot 180. A disc 181 having one side thereof notched or cut away as indicated at 182 to form a kidney shaped plate is slidably supported upon the pivot 180. A pair of oppositely directed concave discs 183 are secured to opposite sides of the plate 181, the discs being opposed and concentric with the plate 181. Apertures 184 through the discs 183 accommodate the pivot shaft 180. A leaf spring 185 may be secured to one of the discs 183 to extend along the shaft 180 and to apply friction thereto to hold the plate 181 in a desired relation. The operation of the apparatus has to some extent been explained in conjunction with various portions of the apparatus. The device is readily portable when the casters or rollers 14 are in contact with the floor and can be moved to a desired position with respect to the subject to be photographed. The lever 31 may then be actuated to lower the feet 17 into contact with the floor and to raise the casters 14 out of contact therewith so as to hold the apparatus from further movement. The device may be regulated to a predetermined elevation by the crank 50, the position being then held by the clamping wheel 54. The frame of the apparatus may then be tilted to a desired angle by the adjustment member 87. An initial setting of the adjustment and tilting the projector frame is possible through the pivoting of the yoke 57 and securing this yoke in a desired position.

A continuously burning light within the housing 79 may then be positioned rearwardly of the light aperture 165 and the position of the lenses 89 and 90 may be regulated in order to properly focus the light upon the subject. The pattern of light desired may be obtained by rotation of the aperture disc 168 and the sharpness of the edges of the pattern may be regulated by rotation of the plate 181 forwardly of the light aperture.

When light has been properly focused upon the subject and the photographer is ready to take a picture, it is only necessary to energize the solenoid coil 159 which actuates the escapement mechanism on the plunger 150 to rotate the disc 121 about its axis. This movement moves a bulb such as 125 in front of the light aperture to direct its light therethrough. During this movement the inner contacts 145 and 146 engage the light bulb socket contacts 140 and 141, thereby providing means of energizing the flash bulb 125.

The picture is then taken in the conventional manner, the circuit to the flash bulb 125 being closed simultaneously with the operation of the camera shutter. However, the light projected is shaped by the aperture plate 168 and is regulated by the plate 181 to provide the desired intensity of outline.

Figures 20, 21 and 22 show a modified form of construction used in conjunction with electronic flash bulbs. These bulbs provide an intense light for a short period of time, but differ from usual flash bulbs in that they may be used repeatedly. Such electronic flash bulbs may be used in conjunction with a suitable circuit, not illustrated in the drawings, as it is known in the art.

In Figures 20, 21 and 22, the light housing 186 is substantially identical to the previously described light housing 79. The housing 186 is provided with a floor or bottom panel 187 beneath which the solenoid coil 189 is supported. The coil 189 is provided with an armature which forms a part of a plunger 190 having an upwardly turned extremity 191. The end 191 extends upwardly through a suitable aperture in the floor 187 of the housing and through a plate 192 supported above the floor 187 and in spaced relation thereto by spacers 193. The upper end of the armature end 191 is provided with a bearing washer 194, which may ride upon the surface of the plate 192 and be supported thereby. The plate 192 is provided with an aperture 195 of generally U-shaped form (see Figure 22). This aperture 195 includes two generally parallel legs 196 and 197 which are also parallel to the plunger movement. The legs 196 and 197 are connected by a transverse connecting portion 199 by rounded edges 200 and 201. A point 202 is provided on the inner side of the cross connecting members forming a sharp line of separation between one side of the aperture and the other.

A T-shaped arm 203 is pivotally connected at 204 to the armature end 191. Thus reciprocation of the armature 190 must also cause reciprocation of the arm 203. A pin 205 extends upwardly from the arm 203 and extends through the slot or aperture 195. The cross arms 206 of the T-shaped arm 203 are held in proper position by upwardly extending ears 207 which engage the undersurface of the plate 192 and by downwardly extending ears 208 which engage the upper surface of the bottom panel 187.

Upon reciprocation of the armature 190, pin 205 of the T-shaped arm 203 moves forwardly until it engages the rounded edge 200 of the aperture, whereupon the direction of travel is changed and the inertia of the movement coupled with the cam effect of the rounded portion 200 of the aperture throws the pin 205 laterally across the aperture to a point beyond the dividing point 202. Rearward reciprocation of the armature 190 causes the pin 205 to engage the inner edge of the U-shaped aperture on the lower side of the same, as viewed in Figure 22, the T-shaped arm being forced by the cam effect of this side of the slot to a position opposite the first extreme position shown in Figure 22. The next reciprocation of the armature will produce a reverse effect, the pin 205 engaging a rounded edge 201 of the aperture and being forced by inertia and by the cam effect of this rounded edge upwardly in the aperture as it is viewed in Figure 22, until the pin 205 extends beyond the point 202. Reverse movement of the plunger then forces the pin into the leg 196 of the aperture until it assumes its starting position illustrated.

A segment shaped support 209 is pivotally supported at 210 in spaced relation above the plate 192. A radially extending slot 211 is provided in the undersurface of the segment to accommodate the upper end of the pin 205. A slotted plate 212 underlies the segment 209 beneath the slot 211 and assists in restricting the movement of the pin 205 to the proper path.

As the T-shaped arm 203 reciprocates and oscillates, moving the pin 205 from one leg 196 of the aperture 195 to the leg 197 thereof, the pin similarly swings the segment 209 between two extreme positions. An aperture 213 is provided in the light housing 186 forwardly of the segment 209. The segment 209 supports a lamp socket 214 which supports a bulb of the continuously burning type 215. The segment 209 also supports a second socket 216 in which is provided a bulb 217 of the type used in electronic flash light structures. In one extreme position of the segment the bulb 215 is aligned with the aperture 213 while in the other extreme position the light bulb 217 is positioned in alignment with the aperture.

A pair of contacts 219 and 220 are mounted in spaced relation upon the plate 192 and these contacts are engageable with fixed contacts 221 on the segment 209. A second pair of contacts 222 are supported on the opposite side of the segment 209 engageable with fixed contacts 223 on the segment 209. In the position illustrated in Figure 21, the segment contacts 223 are engaged with the contacts 222 and suitable conductors extend from the fixed contacts 223 to the light bulb terminals of socket 214 to supply a suitable current such as a 110 volt current thereto. In the other extreme position of the segment the plates 219 and 220 engage the fixed contacts 221, closing a circuit to the electronic flash bulb 217 and supplying the proper voltage thereto.

The housing 186 is provided with suitable supporting means similar to that previously described in conjunction with the housing 79. In other words, an aperture disc, a light diffusing disc or plate, and other such elements may be mounted forwardly of the aperture plate in the manner previously described.

The solenoid armature is biased toward one extreme position by a spring 224 so that when the current to the solenoid is broken the pin 205 will be positioned in one leg or the other of the aperture 195. Thus the segment can only come to rest, other than momentarily, in the position shown in Figure 21 or in its opposite extreme position.

In accordance with the patent statutes, I have described the principles of construction and operation of my light projecting apparatus, and while I have endeavored to set forth the best embodiments thereof, I desire to have it understood that these are only illustrative thereof and that obvious changes may be made within the scope of the following claims without departing from the spirit of my invention.

I claim:

1. A light projector for photographic illumination including in combination a light housing, an adjustable source of illumination therein including a focusing light and a photo flash light alternately movable to the same relative position, said housing having an aperture, an aperture plate supported forwardly of said aperture, said aperture plate being provided with a series of patterns through which light rays may pass bounded by opaque areas through which light rays will not readily pass, a light diffusing member supported forwardly of said aperture plate, and lens means in the path of the light.

2. The structure described in claim 1 and said adjustable source of illumination including a plurality of alternately operable lights in said light housing selectively supported for successive alignment with said aperture and a plurality of cooperable sources of current associated therewith.

3. A light projecting apparatus including a light housing, a light support movably mounted to at least two positions within said housing, a pair of different light sources mounted upon said light support, said housing having a light aperture therein through which either of said light sources may alternately project different light rays in corresponding successive positions of said light support, means for actuating said light support into said two positions, one of said lights being of a continuously burning type and the other of said lights being of the photography flash type.

4. The structure described in claim 3 and including a light masking means outwardly of said housing through which the light rays passing through said aperture may be directed.

5. A light projecting apparatus including a housing, a light support rotatably mounted within said housing having a light aperture therein, a series of lights angularly spaced within said housing, certain of said lights comprising continuously burning types of lights, and alternate lights being of the flash type, said continuously burning lights requiring a different source of current from the flash type lights, and cooperable means on said light support and in said housing for connecting each light with a circuit capable of providing the proper current as it moves into position to direct lights through said aperture.

6. The structure described in claim 5 and including light diffusing means positioned forwardly of said aperture.

References Cited in the file of this patent

UNITED STATES PATENTS

| | | |
|---|---|---|
| 1,105,829 | Plummer | Aug. 4, 1914 |
| 1,430,827 | Moeckel | Oct. 3, 1922 |
| 1,886,939 | Cameron | Nov. 8, 1932 |
| 2,032,515 | Troup | Mar. 3, 1936 |
| 2,054,013 | Wallace | Sept. 8, 1936 |
| 2,122,416 | Freeman | July 5, 1938 |
| 2,392,502 | Potter | Jan. 8, 1946 |
| 2,408,469 | Malloy | Oct. 1, 1946 |
| 2,622,188 | Seeger | Dec. 16, 1952 |